Aug. 29, 1967 — A. W. HOLSTEIN ETAL — 3,338,153
VENDOR
Filed April 6, 1964 — 4 Sheets-Sheet 1
FIG.1.
FIG.2.
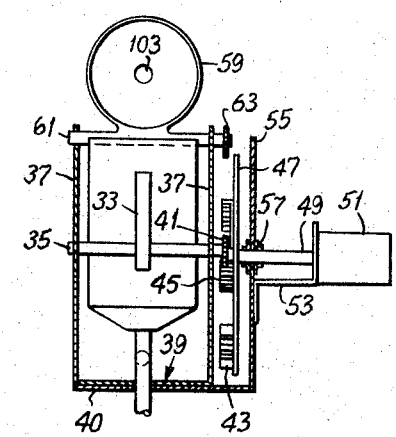
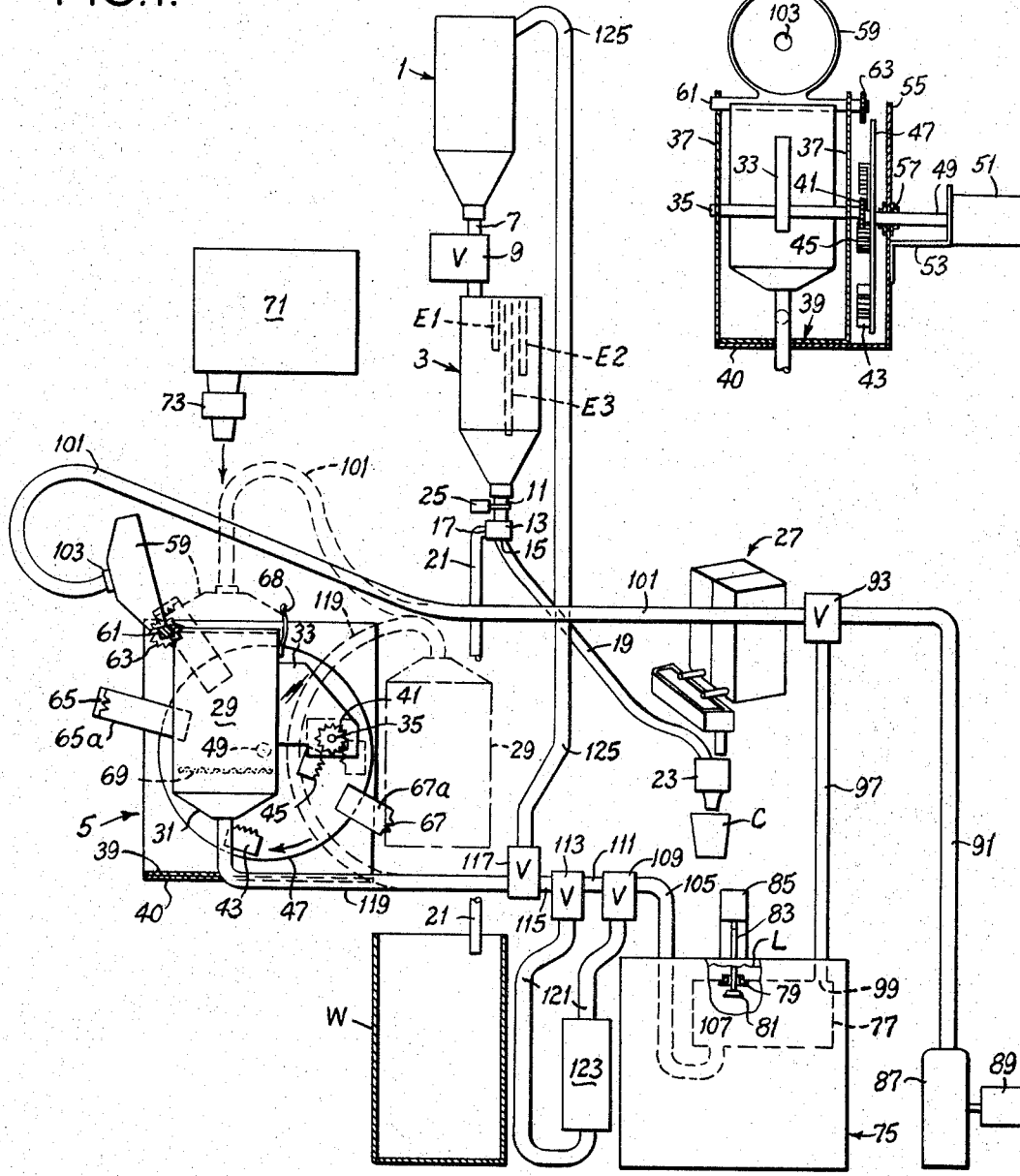
Alvin W. Holstein,
Harry H. Pryor,
William H. Short,
Arthur L. Kessler,
Inventors.
Koenig, Senniger, Powers and Leavitt,
Attorneys.

A. W. HOLSTEIN ETAL  3,338,153

VENDOR

Filed April 6, 1964

United States Patent Office 3,338,153
Patented Aug. 29, 1967

3,338,153
VENDOR
Alvin W. Holstein, Brentwood, Harry H. Pryor, St. Louis, William H. Short, St. Ann, and Arthur R. Kessler, St. John, Mo., assignors to Universal Match Corporation, St. Louis, Mo., a corporation of Delaware
Filed Apr. 6, 1964, Ser. No. 357,575
48 Claims. (Cl. 99—289)

This invention relates to beverage vendors, and more particularly to coin-controlled machines for brewing and vending coffee.

In general, prior vendors for brewing and vending coffee have been of two types, the so-called single-cup brewer in which a single cup of coffee is brewed on each vend cycle and delivered to a cup, and the so-called batch-brew type in which a cup of brewed coffee is vended on each vend cycle from a reservoir containing a batch of brewed coffee, the supply of brewed coffee in the reservoir being automatically replenished, when the level of brewed coffee in the reservoir is drawn down to a low level, by brewing a fresh batch and delivering it to the reservoir. One of the problems attendant upon the single-cup brewer is that a relatively considerable amount of time is involved in brewing a cup of coffee for delivery on each vend cycle. While this problem is generally not involved in the batch-brew type of vender (where a cup of coffee may be quickly delivered from the reservoir), the batch-brew vendor presents another problem in that if brewed coffee remains in the reservoir for any considerable length of time, it loses its flavor and should be dumped. In the usual prior batch-brew type of vendor, where a relatively large quantity of coffee is brewed on each brew cycle, a relatively large quantity of brewed coffee may remain in the reservoir for a relatively long period of time, and dumping of such relatively large quantities of brewed coffee from time to time is wasteful.

Another problem attendant upon both the single-cup and batch-brew types of vendors is the problem of maintaining them in clean and sanitary condition, cleanliness being essential for brewing and vending good coffee. Heretofore, cleaning of coffee vendors has been left to be carried out by the servicemen employed by the operators of vending machine routes, and has been a time-consuming operation, resulting in many instances in too infrequent thorough cleaning with resultant vending of inferior coffee.

Accordingly, among the several objects of this invention may be noted the provision of a vendor for brewing and vending coffee, of a novel type which may be referred to as a small-batch-brew vendor, wherein a cup of coffee is vended on each vend cycle from a relatively small batch, a three-cup batch, for example, as distinguished from a relatively large batch (over twenty cups, for example) thereby considerably reducing waste incurred on dumping batches stored too long in the vendor; the provision of a vendor such as described having a novel brewer for brewing a small batch, using ground coffee dispensed from a supply thereof, and adapted to brew good coffee and deliver it to a dispensing reservoir in time to take care of vending requirements; the provision of a brewer such as described adapted to brew good coffee by forcing a measured supply of hot water upward into a brew pot which has been charged with a measured amount of ground coffee, allowing the water to remain in the pot with the ground coffee for a brew interval, and then forcing the resultant brewed coffee downward out of the pot and delivering it to the dispensing reservoir system; and delivering it to the dispensing reservoir system; the provision of a brewer such as described adapted to uitilize coffee ground from coffee beans, wherein the water is forced upward through a filter and down back through the filter, and which is adapted for discharge of the spent coffee grounds therefrom after the brewing of each batch of coffee; the provision of a vendor such as described which may also be used for brewing instant coffee, if desired; the provsion of a vendor such as described having means for automatically effecting thorough cleaning of the coffee brewing and dispensing systems of the vendor during off periods of use of the vendor; and the provison of cleaning means such as described which automatically comes into operation if more than a predetermined period of time elapses after a vend cycle without a succeeding vend cycle of effect dumping of any brewed coffee remaining in the dispensing reservoir and cleaning and sanitizing of the coffee brewing and dispensing systems. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a semidiagrammatic view of a vendor of this invention;

FIG. 2 is a transverse section of a brew unit of the vendor;

FIG. 3 is a wiring diagram;

FIG. 4 is a chart showing the timing of operations during a brew cycle;

FIG. 5 is a chart showing the timing of operations during a cleaning cycle;

Corresponding reference characters indicate corresponding parts throughout the several views of the drawings.

Figure 6:
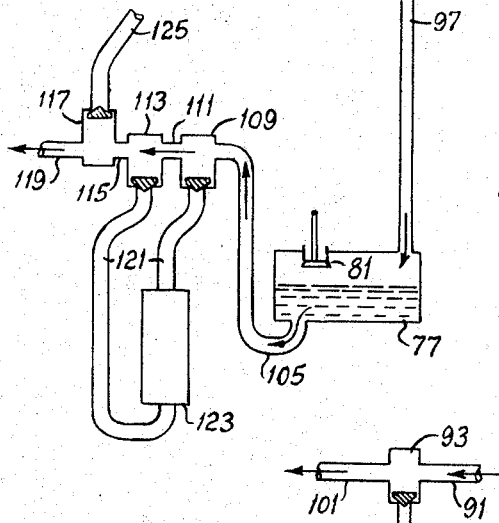
FIGS. 6–8 are flow diagrams.

Referring to FIG. 1 of the drawings, a vendor of this invention for brewing and vending coffee is shown to comprise two relatively small reservoirs or tanks 1 and 3. Reservoir 1 is adapted to receive brewed coffee from a brew unit designated in its entirety by the reference character 5. Reservoir 1, which may therefore be referred to as the receiver, is located above the reservoir 3, which may be referred to as the dispensing reservoir or urn, for gravity flow of brewed coffee from the receiver 1 to the dispensing reservoir 3. This flow is via a conduit 7 under control of a solenoid valve 9, which may be referred to as the brew transfer valve. The dispensing reservoir 3 has a bottom outlet connected by a length of plastic tubing 11 to the inlet of a three-way solenoid valve 13. This valve 13 has two outlets 15 and 17. Conduits 19 and 21 (plastic tubes, for example) extend from these outlets. Conduit 19 is for delivering brewed coffee in single-cup quantities from reservoir 3 to a mixer 23 and thence to a cup C, under control of a solenoid valve 25 shown as a pinch valve operable on tubing 11 by pinching it and adapted to be opened and closed for dispensing of a single cup of coffee from reservoir 3 to the cup. Conduit 21 is for dumping coffee from reservoir 3 into a waste can W. Valve 13, when deenergized, blocks outlet 17 and opens outlet 15 to conduit 19. For vending a cup of coffee from reservoir 3, pinch valve 25 is opened for a timed interval, then closed. Valve 13, when energized, blocks outlet 15 and opens outlet 17 to direct flow of brewed coffee from reservoir 3 through conduit 21 to the waste can. A cream and sugar unit, which may be of any suitable well-known type. is indicated at 27.

The brew unit 5, as illustrated, comprises a brew pot 29 having a bottom 31, and being open at the top.

This has a capacity for brewing three cups of coffee, for example. It is mounted on the end of a rocker arm 33 which extends generally radially from a horizontal rock shaft 35. As shown in FIG. 2, this shaft 35 is journalled at its ends in the sides 37 of a U-shaped shaft support 39 mounted on a fixed brew unit base 40. Shaft 35 is adapted to be oscillated to swing arm 33 through an angle of about 180° between a brew position wherein brew pot 29 is positioned upright as shown in solid lines in FIG. 1 and a dump position wherein brew pot 29 is inverted as shown in dotted lines in FIG. 1. For this purpose, shaft 35 has a pinion 41 fixed thereon, adapted for meshing engagement by either of two sector gears 43 and 45 fixed on one face of a rotary disk 47. This disk is fixed on one end of the output shaft 49 of a gear motor 51 adapted to rotate the disk at relatively low speed (via speed-reducing gearing associated with the motor). Shaft 49 extends horizontally parallel to shaft 35, and disk 47 is located on the outside of one of the sides 37 of the support 39. Motor 51 is mounted on a bracket 53 carried by a vertical plate 55 extending up from the brew unit base 40. Shaft 49 extends through and is journalled in plate 55 at 57.

Disk 47 is adapted to be driven clockwise by motor 51 as viewed in FIG. 1. During each brew cycle, disk 47 is rotated through a single revolution, starting and ending in the home position shown in FIG. 1. When the disk has rotated clockwise about 225° from its home position, sector gear 43 comes into mesh with pinion 41 on the outside of the latter and rotates pinion 41 and shaft 35 clockwise as viewed in FIG. 1 to swing the brew pot 39 over clockwise from its upright brew position to its inverted dump position. When the disk has rotated about 320° from its home position, sector gear 45 comes into mesh with pinion 41 on the inside of the latter and rotates pinion 41 and shaft 35 counterclockwise as viewed in FIG. 1 to return the brew pot to its upright brew position.

A lid 59 is provided for closing the top of the brew pot with a tight seal when the latter is in its upright brew position. This lid is mounted on a rock shaft 61 journalled at its ends in sides 37 of shaft support 39. Shaft 61 carries a pinion 63 engageable by sector gears 65 and 67 on arms 65a and 67a extending radially outward from disk 47. These sector gears are phased so that, when disk 47 has rotated through about 30° from its home position, sector gear 65 engages pinion 63 on the outside of the latter and swings shaft 61 and lid 59 clockwise as viewed in FIG. 1 to close the lid. This occurs with the brew pot in its upright position. Then, after disk has rotated about 195° from its home position, sector gear 67 engages pinion 63 on the inside of the latter and swings shaft 61 and lid 59 counterclockwise to open the lid. This occurs before the brew pot swings to its dump position. A latch such as indicated at 68 may be provided to latch the lid in closed position.

Brew pot 29 has a filter screen 69 mounted therein adjacent its bottom. Mounted above the brew unit 5 is a hopper 71 for ground coffee, having a solenoid-actuated ground coffee dispenser 73 of any suitable well-known type adapted on energization to dispense a metered amount of ground coffee appropriate for brewing three cups of coffee. Dispensing of the ground coffee occurs when the brew pot 29 is in its upright brew position and lid 59 is open, the ground coffee dispensed from the hopper 71 dropping into the brew pot onto the filter screen 69 (which is of sufficiently fine mesh to retain the ground coffee).

Hot water for brewing coffee in the brew pot 29 is supplied from a hot water tank 75. This is maintained filled with water to a level such as indicated at L, and the water is maintained heated to relatively high temperature (short of boiling) by any of suitable means for this purpose well known in the art. Suitably mounted in the tank below level L is a closed water metering vessel 77 having a capacity corresponding to the number of cups to be brewed in the brew cup on each brew cycle. For a three-cup brew as herein illustrated, vessel 77 has a three-cup capacity. The vessel 77 has an inlet at the top fitted with an annular valve seat 79. This seat is engageable by a valve 81 on a solenoid-operated valve stem 83, the solenoid for operating the valve being indicated at 85. When the solenoid 85 is deenergized, valve 81 is open for filling of vessel 77 with hot water from the tank 75. When the solenoid is energized, valve 81 closes to close off vessel 77 from the tank 75.

The measured quantity (three cups) of hot water in vessel 77 is adapted to be forced out of the vessel and delivered to the brew pot by compressed air. For this purpose, there is provided an air compresser 87 driven by an electric motor 89. An air conduit 91 extends from the outlet of the compressor to a first port of a three-way air control solenoid valve 93. An air conduit 97 extends from a second port of the valve 93 to an air inlet port 99 for the vessel 77, and an air conduit 101 extends from a third port of the valve 93 to a port 103 in the brew pot lid 59. This conduit 101 is flexible to permit swinging of the lid. A conduit 105 (which, as will appear, is for both water and air) extends from an outlet 107 of the vessel 77 to the inlet port of a three-way solenoid valve 109. A conduit 111 interconnects a first outlet port of valve 109 and a first port of a three-way solenoid valve 113. A conduit 115 interconnects a second port of valve 113 to the inlet of a three-way solenoid valve 117. A conduit 119 interconnects a transfer port of valve 117 and a port in the bottom of brew pot 29. Conduit 119 is flexible to permit swinging of the brew pot. A conduit 121 having a cartridge 123 of a suitable cleaning agent therein (such as that sold under the trade name Calgon, for example) is connected between a second outlet port of valve 109 and a third port of valve 113. A conduit 125 extends from an outlet port of valve 117 to the receiver 1.

Figure 8:
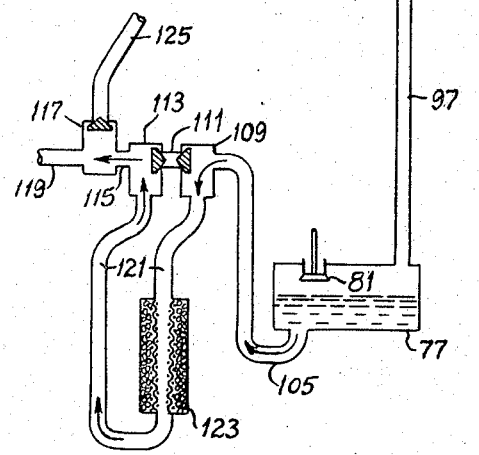
Figure 7:
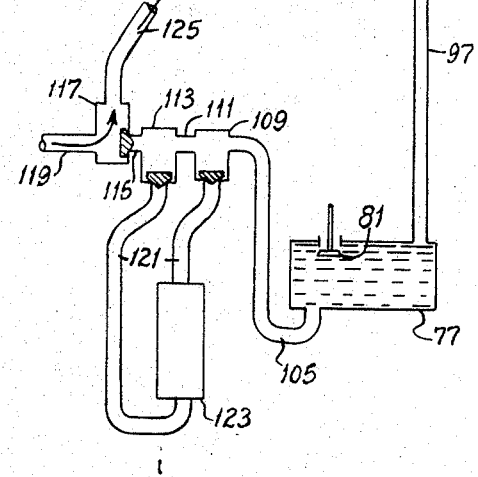

Valve 93, when deenergized, connects conduits 91 and 97 and blocks conduit 101 (see FIGS. 6 and 8). Valve 93, when energized, connects conduits 91 and 101 and blocks conduit 97 (see FIG. 7). Valve 109, when deenergized, connects conduits 105 and 111 and blocks conduit 121 (see FIGS. 6 and 7). Valve 109, when energized, connects conduits 105 and 121 and blocks conduit 111 (see FIG. 8). Valve 113, when deenergized, connects conduits 111 and 115 and blocks conduit 121 (see FIGS. 6 and 7). Valve 113, when energized, connects conduits 121 and 115 and blocks conduit 111 (see FIG. 8). Valve 117, when deenergized, connects conduits 115 and 119 and blocks conduit 125 (see FIGS. 6 and 8). Valve 117, when energized, connects conduits 119 and 125 and blocks conduit 115 (see FIG. 7).

Figure 3:
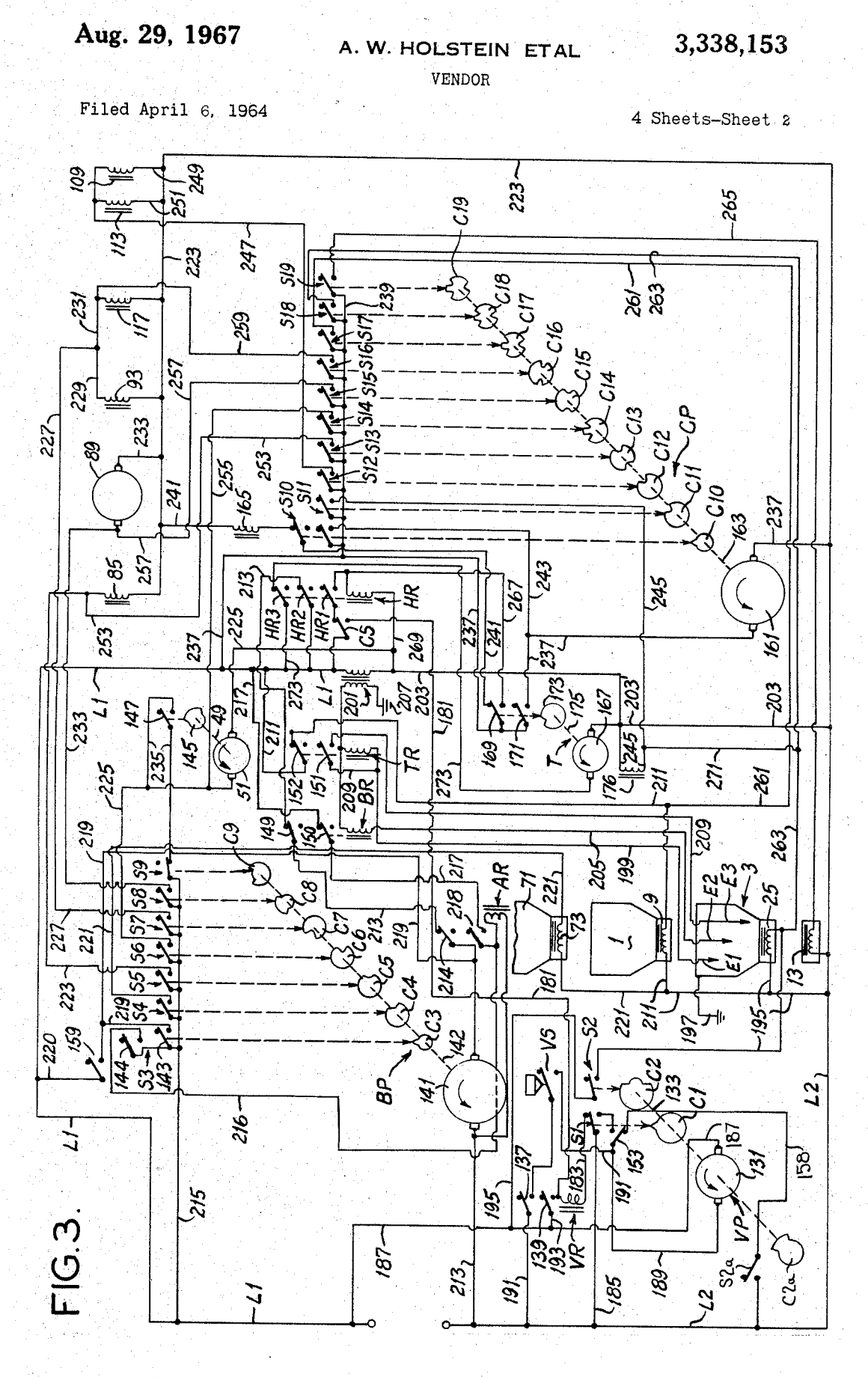

Now referring to FIG. 3, which illustrates the electrical circuitry of the vendor, reference characters L1 and L2 designate main power lines adapted to be plugged into a power outlet, VP generally designates a vend programmer, BP generally designates a brew cycle programmer, and CP generally designates a cleaning cycle programmed.

The vend programmer VP comprises a vend programmer motor 131 and three switches controlled by cams on a cam shaft 133 driven by this motor. These switches are designated S1, S2 and S2a and the respective cams are designated C1, C2 and C2a. Cam C1 and switch S1 (which is a double-throw switch) control the motor 131. Cam C2 and switch S2 (which is a single-throw switch) control the brewed-coffee-dispensing pinch valve 25. The function of cam C2a and switch S2a will be described later. A push button vend switch is indicated at VS. A vend relay is indicated at VR, having two sets of normally open contacts 137 and 139.

The brew cycle programmer BP comprises a brew cycle programmer motor 141 and a series of switches controlled by cams on a cam shaft 142 driven by the motor. These switches are designated S3, S4, S5, S6, S7, S8 and S9, and the respective cams are designated C3, C4, C5, C6, C7, C8 and C9. Switch S3 has two sets of normally open contacts 143 and 144. Cam C3 and switch S3 control the motor 141 and a so-called automatic cycle relay AR via contacts 143 and 144, respectively. Cam C4 and switch S4 control the solenoid-operated ground coffee dispenser 73. Cam C5 and switch S5 control the solenoid 85 of the metering vessel valve 81. Cam C6 and switch S6 constitute a first control for the brew unit motor 51. Cam C7 and switch S7 control the solenoid valves 93 and 117. Cam C8 and switch S8 control air compressor motor 89. Cam C9 and switch S9 constitute a second control for the brew unit motor 51.

The output shaft 49 of the brew unit motor 51 carries a cam 145 which operates a control switch 147 for the brew unit motor 51. Cam 145 is designed to hold switch 147 open for somewhat less than the first 110° of rotation of the cam, and then effects closure of switch 147 until the cam returns to home position whereupon the switch opens. A brew programmer relay is indicated at BR having two sets of normally closed contacts 149 and 150. These contacts open when the coil of relay BR is energized. A transfer relay is indicated at TR, having three sets of contacts 151, 152 and 153. Contacts 151 are normally open; contacts 152 are normally closed. Contacts 153 constitute a double-throw switch, normally closed on the lower contact thereof as shown in FIG. 3. Switch S2a, which is a normally open single-throw switch, is connected in a line 158 between the lower contact of switch 153 and line L2. A coin switch is indicated at CS. This is a double-throw switch normally closed on an upper contact as shown, and closing on a lower contact upon deposit of a coin. A test switch is indicated at 159.

Three electrodes E1, E2 and E3 extend down into the dispensing reservoir 3. Electrode E1 is a relatively short electrode, adapted to detect filling of reservoir 3 with brewed coffee to the three-cup level. That is, the lower end of electrode E1 is at the three-cup level in reservoir 3. Electrode E2 is an intermediate length electrode, adapted to detect drawing off of a second cup of coffee from reservoir 3. Electrode E3 is a relatively long electrode, adapted to detect the drawing off of a third cup of coffee from reservoir 3. Electrodes E1 and E3 are adapted to control the transfer valve 9 as will appear, for closing this valve when the level of coffee rises to the level of the lower end of electrode E1 (the three-cup level) and for opening this valve when the level of coffee drops below the lower end of electrode E3 on drawing off the third cup of coffee from reservoir 3. Electrode E2 is a trigger for initiating a brew cycle.

The cleaning cycle programmer CP comprises a motor 161 and a series of switches controlled by cams on a cam shaft 163 driven by the motor. The switches are designated S10, S11, S12, S13, S14, S15, S16, S17, S18 and S19, and the respective cams are designated C10, C11, C12, C13, C14, C15, C16, C17, C18 and C19. Cam C10 and switch S10 (which is a double-pole double-throw switch) control the motor 161 and a coin return electromagnet, the coil of which is indicated at 165. Cam C11 and switch S11 control a timer generally designated T, which comprises a timer motor 167 and a pair of switches 169 and 171 controlled by a cam 173 on a cam shaft 175 driven by the motor via a zero reset clutch mechanism operated by a coil 176. Switch 171 is a single-throw normally open switch; switch 169 is a double-throw switch normally closed on its upper contact. The timer is of a known type in which, the motor 167 being continuously energized, cam 173 is continuously driven to register elapsed time from zero, but is reset back to zero at any time that reset coil 176 is energized to release the reset clutch mechanism. Cam 173 is designed to hold switch 171 open and to hold switch 169 on its upper contact for a predetermined period of elapsed time from zero, four hours as herein illustrated, and to effect closure of switch 171 and closure of switch 169 on its lower contact upon elapse of this period of time from zero. Cam C12 and switch S12 control valves 109 and 113. Cam C13 and switch S13 control the solenoid 85 of the metering vessel valve 81. Cam C14 and switch S14 control the brew unit motor 51. Cam C15 and switch S15 control the air compressor motor 89. Cam C16 and switch S16 control the solenoid valves 93 and 117. Cam C17 and switch S17 control the transfer valve 9. Cam C18 and switch S18 control the pinch valve 25. Cam C19 and switch S19 control the three-way solenoid valve 13. Switches S11–S19 are all single-throw switches. A so-called shut-down hold relay is indicated at HR, having a set of normally open contacts HR1 and two sets of normally closed contacts HR2 and HR3.

As shown in FIG. 3, coin switch CS has its movable contactor connected to line L1 and its normally open lower contact connected by a line 181 to the upper terminal of the coil of vend relay VR. The lower terminal of this coil is connected by a line 183 to the normally closed upper contact of double-throw switch S1, and the movable contactor of this switch S1 is connected by a line 185 to line L2. One terminal of vend programmer motor 131 is connected by a line 187 to line L1, and its other terminal is interconnected with the lower normally open terminal of switch S1 by a line 189 which includes the normally open upper contacts of switch 153 of transfer relay TR. Vend switch VS and contacts 137 of the vend relay VR are connected in series in a line 191 interconnecting lines L2 and 189. Contacts 139 of the vend relay are connected as indicated at 193 between line 187 and the upper terminal of the coil of vend relay VR. Switch S2 and pinch valve 25 are connected in a series circuit 195 across lines L1 and L2.

Whenever a purchaser deposits coin in sufficient amount to close coin switch CS on its lower contact, vend relay VR is energized via line 181, line 183, switch S1 (closed on its upper contact) and line 185. Vend relay contacts 137 and 139 thereupon close. Closure of coin switch CS on its lower contact may be momentary, but contacts 139 set up a holding circuit for the vend relay via lines 187, 193, 183, switch S1 (closed on its upper contact) and line 185. The purchaser may now obtain a cup of coffee from reservoir 3 by pushing vend switch VS, even though coin switch CS has closed back on its upper contact. The result of closure of vend switch VS is to complete a circuit for vend programmer motor 131 via line 187, line 189 and line 191 (switches VS and contacts 137 being closed). This starts motor 131 in operation to drive cams C1 and C2. Cam C1 is designed to close switch S1 on its lower contact immediately after the motor 131 starts, and this sets up a holding circuit for the motor via lines 187, 189 and 185 (assuming that switch 153 of transfer relay TR is closed on its upper contact). The motor is held in operation until cam C1 has completed a revolution and thrown switch S1 back on its upper contact. Cam C2, rotating with C1, closes switch S2 to energize and open the pinch valve 25. Cam C2 is designed to open pinch valve 25 for a time interval such as to allow one cup of coffee to drain out of reservoir 3, and then to shut it off.

Reservoir 3 is connected to ground as indicated at 197. Electrode E1 is interconnected with the lower terminal of the coil of the transfer relay TR by a line 199. This coil is connected in a circuit powered off the secondary of a transformer 201. The primary of this transformer has one terminal connected to line L1 as shown, and its other terminal connected to line L2 by a line 203. The coil of brew programmer relay BR is connected in series with the secondary of the transformer and electrode E2 in a line 205 connected to one terminal of the secondary of the transformer, the other terminal of the latter being grounded as indicated at 207. Line 199 including electrode E1 and the coil of relay TR is connected to line 205.

Contacts 151 of relay TR are interconnected with electrode E3 in a line 209 connected to line 199. Contacts 152 of relay TR are series-connected with the solenoid transfer valve 9 between lines L1 and L2 via a line 211. Valve 9 is normally closed (i.e., closed when deenergized), and opens on being energized. Brew programmer motor 141 is connected in a motor circuit 213 including contacts HR2 of shut-down hold relay HR, contacts 149 of brew programmer relay BR and normally closed upper contacts 214 of the automatic cycle relay AR. Contacts HR2 being normally closed, this motor circuit is completed when brew programmer relay BR is deenergized (contacts 149 then being closed) and when relay AR is deenergized (contacts 214 then being closed). A line 215 interconnects line L1 and one terminal of each of switches S3–S9. The coil of relay AR is interconnected with contacts 144 of switch S3 in a circuit indicated at 216. A line 217 including normally open contacts 218 of relay AR and normally closed contacts 150 of relay BR interconnects line L1 and circuit 216. Contacts 143 of switch S3 are connected in a holding circuit 219 for motor 141. Cam C3 is designed to actuate switch S3 immediately after motor 141 starts to close contacts 143 and open contacts 144, and this completes holding circuit 219. The motor 141 is then held in operation until cam C3 has completed a revolution and opened switch S3, thereby effecting rotation of cam shaft 142 and the cams thereon through a one-revolution cycle, which, as herein illustrated, takes twenty-five seconds. Test switch 159 is connected in a line 220 between lines L1 and 219 to shunt switch S3 for manually operating motor 141 at any time.

Switch S4 is connected in series with the solenoid-operated ground coffee dispenser 73 across lines L1 and L2 via line 215 and a line 221. Switch S5 is connected in series with the solenoid 85 of the metering vessel valve 81 across lines L1 and L2 via line 215 and a line 223. Switch S6 is connected in series with brew unit motor 51 across lines L1 and L2 via line 215, a line 225 and line 203. Switch S7 is connected in a line 227 leading to parallel branch lines 229 and 231 including solenoid valves 93 and 117, lines 229 and 231 being shown as connected to line 223. Switch S8 is connected in series with air compressor motor 89 in a line 233 shown as connected to line 223. Switch S9 is connected in series with control switch 147 for motor 51 in a line 235 connected to line 225.

Cams C3–C9 are designed to operate switches S3–S9 to effect timing of operations during a brew cycle as shown in the FIG. 4 chart. This chart shows timing on the basis of a twenty-five second brew cycle. As appears from the chart, cam C3 actuates switch S3 slightly after 0 second and holds it with contacts 143 closed and contacts 144 open until slightly before 25 seconds to effect rotation of cam shaft 142 through a single revolution for timing a twenty-five second brew cycle. Cam C4 closes switch S4 at 1 second of elapsed time and holds it closed until the 6th second to effect energization of solenoid-operated dispenser 73 to dispense ground coffee from hopper 71 in measured amount for brewing a three-cup batch of coffee. Cam C5 closes switch S5 at 2½ seconds of elapsed time to energize the solenoid 85 of the metering vessel valve 81 and holds it closed until the 13th second for metering a measured amount of hot water from the hot water tank 75 to the brew pot as will appear. Cam C6 closes switch S6 at 2½ seconds of elapsed time and holds it closed for two seconds. Cam C7 closes switch S7 at 13 seconds of elapsed time and holds it closed until the 19th second. Cam C8 closes switch S8 at 3 seconds of elapsed time and holds it closed until the 19th second. Cam C9 initially holds switch S9 closed, opens it at 1 second of elapsed time, closes it at 19½ seconds, and holds it closed until the 1st second of the next brew cycle.

Contacts 171 of timer T are connected in series with cleaning cycle programmer motor 161 across lines L1 and L2 in a circuit indicated at 237. This circuit is completed on closure of contacts 171 upon operation of timer T for four hours without reset. A line 239 feeds each of switches S10–S19 from line L1 via line 237. Coin return electromagnet 165 is connected in series with the upper normally closed contacts of switch S10 in a line 241 between line 223 and the upper contact of switch 169. A line 243 interconnects the lower contact of switch S10 and line 237 to provide a holding circuit for motor 161. Cam C10 is designed to cause switch S10 to drop off its upper coin return electromagnet contact and close on its lower holding circuit contact immediately after motor 161 starts, to hold motor 161 in operation until cam C10 has completed a revolution, thereby effecting rotation of cam shaft 163 and the cams thereon through a one-revolution cycle, which as herein illustrated takes 300 seconds.

Switch S11 is connected across lines L1 and L2 in series with timer reset coil 176 via a line 245 connected to line 203. Switch S12 is connected in a line 247 leading to parallel branch lines 249 and 251 including solenoid valves 109 and 113, lines 249 and 251 being shown as connected to line 223. Switch S13 is connected in a line 253 for energizing solenoid 85 on closure of switch S13. Switch S14 is connected in a line 255 for energizing brew unit motor 51 on closure of switch S14. Switch S15 is connected in a line 257 for energizing air compressor motor 89 on closure of switch S15. Switch S16 is connected in a line 259 for energizing solenoid valves 93 and 117 on closure of switch S16. Switch S17 is connected in a line 261 for energizing the transfer valve 9 on closure of switch S17. Switch S18 is connected in a line 263 leading to line 211 for energizing pinch valve 25 on closure of switch S18. Switch S19 is connected in a line 265 for energizing dump valve 13 on closure of switch S19.

Cams C10–C19 are designed to effect timing of operations during a cleaning cycle as shown in the FIG. 5 chart. This chart shows timing on the basis of a 300 second cleaning cycle. As appears from the chart, cam C10 throws switch S10 to close holding circuit 243 at approximately 0 second and holds it closed for about 297 seconds to effect rotation of cam shaft 163 through a single revolution for timing a 300 second cleaning cycle. Cam C11 closes switch S11 approximately at 0 second of elapsed time and holds it closed for about 5 seconds. Cam C12 closes switch S12 at 15 seconds of elapsed time and holds it closed until the 30th second. Cam C13 closes switch S13 at 15 seconds of elapsed time, opens it at 80 seconds, closes it again at 165 seconds, and opens it at 230 seconds. Cam C14 closes switch S14 at approximately 0 second, opens it at 2 seconds, closes it again at 285 seconds, and opens it at 289½ seconds. Cam C15 closes switch S15 at 20 seconds, opens it at 80 seconds, closes it again at 170 seconds, and opens it at 230 seconds. Cam C16 closes switch S16 at 65 seconds, opens it at 80 seconds, closes it again at 215 seconds, and opens it at 230 seconds. Cam C17 closes switch S17 at approximately 0 second, opens it at 15 seconds, closes it again at 105 seconds, opens it at 145 seconds, closes it again at 255 seconds, and opens it at 295 seconds. Cam C18 closes switch S18 at approximately 0 second, opens it at 15 seconds, closes it again at 130 seconds, opens it at 145 seconds, closes it again at 280 seconds, and opens it at 295 seconds. Cam C19 closes switch S19 at aproximately 0 second, opens it at 15 seconds, closes it again at 130 seconds, opens it at 145 seconds, closes it again at 280 seconds, and opens it at 295 seconds (the same as the operation of cam C18 on switch S18).

Contacts HR1 of the shut-down hold relay HR are connected in a line 267 between the upper contact of the coin switch CS and the lower contact of timer switch 169. The coil of relay HR is connected between lines 203 and 267 as indicated at 269. At 271 is indicated a line which interconnects lines 245 and 263. Contacts HR3 of the shut-down hold relay and timer motor 167 are series-connected between lines L1 and L2 via a line 273 connected between line L1 and line 203.

Operation is as follows:

For purposes of describing the operation of the vendor, it will be assumed that the dispensing reservoir or urn 3 contains three cups of brewed coffee, ready to be vended, that hot water tank 75 is filled to the level L with hot water, that metering vessel 77 holds three cups of hot water, having been filled from the tank 75, and that less than four hours has lapsed since the previous vend. With reservoir 3 full of coffee, relays BR and TR are energized. Contacts 149 and 150 of relay BR therefore are open. Contacts 151 of relay TR are therefore closed; contacts 152 are open; and switch 153 of relay TR is closed on its upper contact.

On deposit of coin in appropriate amounts by a purchaser, coin switch CS is momentarily closed on its lower contact. This results in energization of the vend relay VR via lines 181 and 183, switch S1 (which is closed on its upper contact at this time) and line 185. Contacts 137 and 139 of relay VR close. Contacts 139 thereupon establish a holding circuit for relay VR via line 187, line 193, contacts 139, line 183, switch S1 and line 185. This holds relay VR energized to allow time for the purchaser to operate vend switch VS after having deposited his coin.

On operation of vend switch VS by the purchaser, a circuit for the vend programmer motor 131 is completed via line 187, line 189 and line 191 (including closed contacts 137 of relay VR), and motor 131 is thereby set in operation to drive cam shaft 133 through a single revolution. Shortly after motor 131 starts, cam C1 causes switch S1 to open off its upper contact and close on its lower contact. This breaks the holding circuit for relay VR, and its contacts 137 and 139 open. Transfer relay TR, as above noted, is energized at this time, and the switch 153 is therefore closed on its upper contacts. When switch S1 closes on its lower contact, a holding circuit for motor 131 is established via line 187, line 189, the upper contacts of switch 153, switch S1 (closed on its lower contact) and line 185. The motor 131 is thereby held in operation until cam C1 has thrown switch S1 back on its upper contact at the completion of a revolution of cam shaft 133, and is then deenergized.

During the rotation of cam shaft 133 through a revolution as above described, cam C2 effects closure of switch S2 to energize pinch valve 25 via line 195 and hold valve 25 open for a time interval such as to allow one cup of coffee to drain out of reservoir 3 via valve 13 (deenergized at this time) and flow through conduit 19 to the mixer 23 and thence to the cup C. It will be understood that the vender will include a suitable cup dispenser of well-known type for dispensing a cup into position below mixer 23 on each vend cycle.

Up to the time that switch S2 is closed by cam C2, the motor 167 of timer T is continuously energized to drive the timer cam 173, via line 273 including the normally closed contacts HR3 of relay HR (which is deenergized at this time) and line 203. Motor 167 drives timer cam 173 through the zero reset mechanism including reset coil 176. When switch S2 closes, coil 176 is energized, a circuit therefor being completed from line L1 to line L2 via line 187, line 195 (in which switch S2 is closed), line 263, line 271, line 245, and line 203. This resets the timer cam 173 to zero, and such reset of the timer cam to zero occurs each time vend switch VS is operated by a purchaser after deposit of coin to buy a cup of coffee.

When the first cup of coffee is dispensed from reservoir 3 as above noted, the level of brewed coffee in reservoir 3 is drawn down to the two-cup level and falls below the lower end of electrode E1, but this has no immediate effect on operations. The next time a purchaser deposits coin in appropriate amount and operates vend switch VS to buy a cup of coffee, the above-described vend cycle is repeated, and on this second vend, the level of brewed coffee in reservoir 3 is drawn down below the lower end of electrode E2 (i.e., drawn down to the one-cup level). When electrode E2 is exposed, a brew cycle is initiated.

Exposure of electrode E2 opens line 205 to deenergize the brew programmer relay BR, resulting in closure of contacts 149 and 150 of this relay. With relay HR deenergized at this time and its contacts HR2 closed, and with relay AR deenergized at this time and its contacts 214 closed, circuit 213 for brew programmer motor 141 is completed to trigger off a brew cycle.

Upon energization of the brew programmer motor 141, operation of cam shaft 142 through its 25 second single-revolution cycle is initiated. As soon as motor 141 starts, cam C3 actuates switch S3 to close its contacts 143 and 144. This has two results: it completes holding circuit 219 for motor 141 via closed contacts 143 and energizes relay AR via circuit 216 including closed contacts 144. Contacts 214 then open, and contacts 218 close to set up a holding circuit for relay AR via line 217 including closed contacts 150 of relay BR. The motor 141 is held in operation until the cam shaft 142 has completed a revolution, whereupon switch S3 is thrown back to its initial position to open contacts 143 and 144. Opening of contacts 143 deenergizes motor 141. At 1 second of elapsed time from the start of motor 141, cam C4 closes switch S4 and maintains it closed for five seconds. With switch S4 closed, the solenoid-operated ground coffee dispenser 73 is energized via line 221, and ground coffee is dispensed from hopper 71 in measured amount for brewing a three-cup batch of coffee. The brew pot 29 is in its upright brew position at this time, and its lid 59 is open, as shown in solid lines in FIG. 1. The ground coffee drops into the brew pot, falling on to the filter screen 69 adjacent the bottom of the pot.

Following the initiation of operation of the ground coffee dispenser 73 to dispense ground coffee into the brew pot, switches S5 and S6 are closed simultaneously (at 2½ seconds of elapsed time from the start of the brew cycle) by cams C5 and C6. On closure of switch S5, a circuit for solenoid 85 is completed via line 223, and this solenoid closes the valve 81 to close off the water metering vessel 77 from communication with the hot water tank 75, and holds it closed until the 13th second of elapsed brew cycle time. On closure of switch S6, a circuit for brew unit motor 51 is completed via line 225, and is held for two seconds by the cam C6. Motor 51 thereupon rotates disk 47 (and cam 145 for two seconds) through an angle of about 110° from the home position of the disk in which it is shown in solid lines in FIG. 1 and stops. As the disk rotates through this initial 110° of a revolution, sector gear 65 comes into mesh with pinion 63 on the rock shaft 61 which carries the brew pot lid 59, and this rotates shaft 61 to close the lid and latch it closed. The dotted-line position of the lid shown in FIG. 1 is its closed position. Closure of the lid occurs after dispensing of ground coffee into the pot.

At 3 seconds of elapsed brew cycle time, cam C8 effects closure of switch S8, and holds it closed until the 19th second of elapsed brew cycle time. On closure of switch S8, a circuit for air compressor motor 89 is completed via line 233. Motor 89 thereupon drives air compressor 87 to supply compressed air to conduit 91.

Valves 93, 109, 113 and 117 are all deenergized at this time. Accordingly, compressed air is delivered via conduit 91, valve 93 and conduit 97 to the metering vessel 77, and forces the three cups of hot water in vessel 77 out through conduit 105, valve 109, conduit 111, valve 113, conduit 115, valve 117 and conduit 119 to the brew pot 29 (see FIG. 6). The hot water enters the brew pot through the bottom 31 of the pot, and rises up through the filter screen 69 into the brew pot for brewing a three-cup batch of coffee in the pot. Line 121 is blocked off at valves 109 and 113 so that the water does not by-pass through the cleaning agent cartridge 123. Delivery of the hot water to the pot is followed by delivery of air to effect agitation of the brew in the pot for effective brewing.

At 13 seconds of elapsed brew cycle time, cam C7 effects closure of switch S7, and holds it closed until the 19th second of elapsed brew cycle time. On closure of switch S7, solenoid valves 93 and 117 are energized via lines 227, 229, 231 and 223. With valves 93 and 117 energized, compressed air is delivered via conduit 91 (the air compressor motor 89 remaining in operation until the 19th second of elapsed time) through valve 93 to conduit 101 and thence into the top of the brew pot 29 to force the brewed three-cup batch of coffee downward out of the pot through conduit 119, valve 117, and conduit 125 (see FIG. 7) to the receiving reservoir 1, wherein it is held since transfer valve 9 is deenergized and hence closed at this time.

It will be observed that some ten seconds of time elapse between the start of delivery of hot water to the brew pot 29 and the start of delivery of compressed air to the top of the brew pot to discharge brewed coffee from the pot. Thus, an interval of about ten seconds is provided for infusion of the ground coffee in the hot water in the pot, while agitating the brew by means of air, for brewing three cups of coffee in the pot. When the brewed coffee is forced downward out of the pot by compressed air delivered to the top of the pot, the spent coffee grounds are filtered out by the screen 69 and remain thereon.

At 19½ seconds of elapsed brew cycle time, cam C9 closes switch S9 and holds it closed. Prior to closure of switch S9, brew unit motor 51 has rotated shaft 49 through 110°, and switch 147 is closed. This establishes a circuit for motor 51 via line 235 (switch 147 being closed) and line 225, and holds it so that motor 51 completes the rotation of the disk 47 through 250° back to its FIG. 1 home position. During this final phase of rotation of the disk, sector gear 67 meshes with pinion 63 and swings the brew pot lid 59 open. Then, sector gear 43 meshes with pinion 41 and swings the brew pot 29 over from its upright brew position to its inverted dumping position to dump the spent coffee ground into the waste can W. Finally, sector gear 45 meshes with pinion 41 and swings the brew pot back to its brew position, and then disk 47 terminates its rotation back at its home position. This occurs due to opening of switch 147 by cam 145.

The next time a purchaser deposits coin in appropriate amount and operates vend switch VS to buy a cup of coffee, the above-described vend cycle is repeated a third time, and on this third vend, the level of brewed coffee in reservoir 3 is drawn down below the lower end of electrode E3 (i.e., drawn down below the one-cup level). The immediate effects of this is that the circuit 209 for the coil of transfer relay TR is opened to deenergize relay TR, resulting in opening of the TR relay contacts 151, closing of the TR relay contacts 152, and dropping of switch 153. Upon closure of contacts 152, transfer valve 9 is energized to open it via line 211, and the three-cup batch of brewed coffee in reservoir 1 drains down into reservoir 3.

As the reservoir 3 fills with brewed coffee from reservoir 1 through the opened transfer valve 9, and when the level of coffee in reservoir 3 reaches electrode E2, brew programmer relay BR is re-energized via line 205, opening contacts 149. This places an additional break in the circuit 213 for brew programmer motor 141. When the level of coffee in reservoir 3 reaches electrode E1, the transfer relay TR is energized via line 199, resulting in closure of contacts 151, raising of switch 153 and opening of contacts 152. This conditions the system for proceeding through another brew cycle when the next two cups of coffee are dispensed from reservoir 3.

From the above, it will be observed that vending operations may be considered as starting with three cups of brewed coffee in reservoir 3. On the first vend (effected by the deposit of coin in appropriate amount and operation of vend switch VS by a purchaser), the level of coffee in reservoir 3 is drawn down to the two-cup level. On the second vend, the level is drawn down to the one-cup level, and on the third vend, reservoir 3 is emptied. For replenishing the supply of brewed coffee in reservoir 3, a brew cycle is initiated when the level of coffee in reservoir 3 is drawn down below the lower end of electrode E2, i.e., during the vending of the second cup of coffee (and before the vending of the third cup). During the brew cycle, a fresh three-cup batch of coffee is brewed and delivered to reservoir 1. This batch remains in reservoir 1 until the last cup (the third cup) in reservoir 3 is vended. Then, transfer valve 9 opens to deliver the fresh batch to reservoir 3. By this time, the last cup of the previous batch in reservoir 3 has drained out, and pinch valve 25 has closed to hold the fresh three-cup batch in reservoir 3. Now, vending may continue from reservoir 3. Each time the level of coffee in reservoir 3 is drawn down, the vendor operates through a brew cycle as above described to recharge reservoir 3 with a three-cup batch. Brewing of the batch and delivery to the reservoir 3 occurs while vending is proceeding, so that there is no delay and purchasers do not have to wait for coffee to be brewed.

As has been noted, timer T starts timing out a new four-hour interval on each vend. If four hours should elapse without a vend, the timer completes its four-hour run, and this triggers off a cleaning cycle. On completion of a four-hour run of the timer, timer cam 173 effects closure of switch 169 on its lower contact and closure of switch 171.

Upon closure of switch 169 on its lower contact, coin return electromagnet 165 is deenergized (having the effect of returning any subsequently deposited coins to a customer until it is reenergized). Relay HR and cleaning cycle programmer motor 161 are energized via lines 269 and 267, switch 169, switch 171 and line 237. Contacts HR2 and HR3 of relay HR open, and contacts HR1 of relay HR close. Opening of contacts HR2 breaks the circuit 213 to the brew programmer motor 141 to hold this out of operation during the cleaning cycle. Opening of contacts HR3 breaks the circuit 273 for the timer motor 167 to hold this out of operation during the cleaning cycle. Closure of contacts HR1 establishes a holding circuit for relay HR via coin switch CS (closed on its upper contact) and lines 269 and 203. Coin switch CS remains closed on its upper contact throughout the cleaning cycle because coin return electromagnet 165 remains deenergized throughout the cleaning cycle, preventing any coins that may be deposited during the cleaning cycle from reaching the coin switch.

As noted above, closure of switch 171 completes circuit 237 for cleaning cycle programmer motor 161 to start the latter in operation to drive cam shaft 163 and cams C10–C19 through the 300 second single-revolution cycle thereof. As soon as motor 161 starts, cam C10 effects closure of switch S10 on its lower contact to complete the holding circuit 243, 237 for the motor to hold it in operation until cam shaft 163 has completed a revolution. Switch S10, in closing on its lower contact, opens off its upper contact, and this further deenergizes coin return electromagnet 165 which, as will be understood, has the effect of rejecting deposited coins until relay 165 is re-energized at the termination of a cleaning cycle.

Also immediately upon the starting of motor 161, cam C11 closes switch S11 for about 5 seconds to energize coil 176 to reset the timer cam 173 to zero. This occurs via lines 245 and 203. Cam C17 closes switch S17 to energize the transfer valve 9 via lines 261 and 211 to open this valve and hold it open for 15 seconds. Cam C18 closes switch S18 to energize the pinch valve 25 via lines 263 and 195 and to hold it open for 15 seconds. Cam C19 closes switch S19 to energize valve 13 via line 265 and to hold it energized for 15 seconds. As a result of opening of valves 9 and 25 and energization of valve 13, any brewed coffee in reservoirs 1 and 3 (which coffee, after four hours, has lost its flavor) drains out of the reservoirs and flows through conduit 21 to the waste can W. Cam C14 closes switch S14 to energize the motor 51 via lines 255 and 225. Switch S14 is held closed for 2 seconds, which results in operation of motor 51 to rotate disk 47 through 110° to close the brew pot lid 59.

At 15 seconds of elapsed cleaning cycle time from the start of motor 161, cam C12 closes switch S12 to energize valves 109 and 113 via lines 247, 249 and 251, and holds these valves energized for 15 seconds, and cam C13 closes switch S13 to energize solenoid 85 via line 253, and holds this solenoid energized until the 80th second of elapsed cleaning cycle time. At 20 seconds of elapsed cleaning cycle time, cam C15 closes switch S15 to energize the air compressor motor 89 via lines 253 and 233, and holds this motor in operation until the 80th second of elapsed cleaning cycle time. With solenoid 85 energized, valve 81 is closed to close off the water metering vessel 77 from communication with the hot water tank 75. With motor 89 in operation, compressed air is delivered via conduit 91 through valve 93 (which is deenergized at this time) and conduit 97 to the metering vessel 77, and forces water from vessel 77 out through conduit 105. With valves 109 and 113 energized, the water flows from conduit 105 through line 121 (see FIG. 8), becoming charged with the cleaning agent in flowing through cartridge 123 to constitute a cleaning solution and the resultant cleaning solution flows through conduit 115, valve 117 (which is deenergized at this time) and conduit 119 to the brew pot 29. The cleaning solution enters the brew pot through the bottom of the pot, and rises up through the filter screen 69 into the brew pot for cleaning the brew pot. The solution is maintained in the brew pot for what may be termed a brew pot boil-out period, and the delivery of the solution to the pot is followed by delivery of air to effect agitation of the solution in the pot for effective boil-out. This boil-out period terminates at about the 65th second of elapsed cleaning cycle time, as will appear.

Transfer valve 9, three-way solenoid valve 13 and pinch valve 25 all are deenergized at the 15th second of elapsed cleaning cycle time. Valves 109 and 113 are deenergized at the 30th second of elapsed time (after the instigation of delivery of the water to the brew pot by the compressed air) and air for agitation of the charged water in the brew pot flows directly from conduit 105 through valve 109, conduit 111, valve 113, conduit 115, valve 117 and conduit 119 to the brew pot without passing through the cleaning agent in cartridge 123. Solenoid 85 is held energized as long as air is delivered (i.e., until the 80th second of elapsed cleaning cycle time) to keep valve 81 closed to hold water out of the metering vessel 77.

At 65 seconds of elapsed cleaning cycle time, cam C16 closes switch S16 to energize valves 93 and 117 via lines 259, 229 and 231, and holds these valves energized until the 80th second of elapsed time. This results in air supplied by compressor 87 (which remains in operation until the 80th second of elapsed time) being directed from conduit 91 through conduit 101 (see FIG. 7) to the top of the brew pot 29 (the lid 59 of which is now closed). This air forces the solution in the brew pot downward out of the pot through conduit 119, valve 117 (now energized) and conduit 125 to the receiving reservoir 1 wherein it is held for a boil-out interval since transfer valve 9 is now deenergized and closed.

The boil-out interval for the reservoir 1 terminates at 105 seconds of elapsed cleaning cycle time, at which time cam C17 recloses switch S17 to reenergize the transfer valve 9, holding it open until the 145th second of elapsed time. The solution in reservoir 1 thereupon drains down into reservoir 3, wherein it is held for a boil-out interval since pinch valve 25 is deenergized and closed. The boil-out interval for reservoir 3 terminates at 130 seconds of elapsed time, at which time cams C18 and C19 close switches S18 and S19 to energize the pinch valve 25 and the three-way solenoid valve 13, holding valve 25 open and holding valve 13 in its setting for discharge through conduit 21 to the waste can W. The solution in reservoir 3 thereupon drains out into the waste can.

With the dumping of the cleaning solution from reservoir 3, what may be termed the wash phase of the cleaning cycle is terminated, and there follows what may be termed the rinse phase of the cleaning cycle. This rinse phase is initiated at 165 seconds of elapsed cleaning cycle time, when cam C13 closes switch S13 to re-energize the solenoid 85 to close valve 81, holding it closed until the 230th second of elapsed time. At 170 seconds of elapsed time, cam C15 closes switch S15 to energize the air compressor motor 89. As a result of this, compressed air is delivered via conduit 91 and valve 93 (now deenergized) and conduit 97 to metering vessel 77, and forces water out of vessel 77 through conduit 105, valve 109 (now deenergized) conduit 111, valve 113 (now deenergized) conduit 115, valve 117 (now deenergized) and conduit 119 (see FIG. 6) to the brew pot 29. This rinse water rises up into the brew pot for rinsing the latter, and is maintained therein for a rinse interval until the 215th second of elapsed time. At this instant, cam C16 closes switch S16 to re-energize valves 93 and 117, and holds them energized until the 230th second of elapsed time. This results in air supplied by compressor 87 (which remains in operation until the 230th second of elapsed time) being directed from conduit 91 through conduit 101 (see FIG. 7) to the top of the brew pot 29 (the lid 59 of which is still closed). This air forces the rinse water downward out of the pot through conduit 119, valve 117 (now energized) and conduit 125 to the reservoir 1 wherein it is held for a rinse interval since transfer valve 9 is now deenergized.

The rinse interval for reservoir 1 terminates at 255 seconds of elapsed cleaning cycle time, at which instant cam C17 closes switch S17 to re-energize transfer valve 9 and hold it open until the 295th second of elapsed time. The rinse water in reservoir 1 drains down into reservoir 3, wherein it is held for a rinse interval since pinch valve 25 is denergized and closed. This rinse interval for reservoir 3 terminates at 280 seconds of elapsed time, at which instant cams C18 and C19 close switches S18 and S19 to energize the pinch valve 25 and the three-way solenoid valve 13, holding valve 25 open and holding valve 13 in its setting for discharge through conduit 21 to the waste can W until the 295th second of elapsed time. The rinse water thereupon drains out of reservoir 3 into the waste can. At 285 seconds of elapsed time, cam C14 closes switch S14 to re-energize the brew unit motor 51 for 4½ seconds. This carries disk 47 through 250° back to its home position to effect opening of the lid 59 of the brew pot. During this phase of the operation, the brew pot swings over from its upright to its inverted position and back to its upright position, but this is inconsequential. The cleaning cycle is thus terminated with the brew pot back in its upright position, with its lid 59 open, and disk 47 back in its home position.

Upon completion of the cleaning cycle, the machine is dormant, without any brewed coffee therein, until a purchaser deposits coin for purchase of a cup of coffee. Upon deposit of coin, the coin switch CS closes momentarily on its lower contact. This breaks the circuit which had been established for the coil of relay HR to deenergize the latter and effect opening of its contacts HR1 and closure of its contacts HR2 and HR3. Closure of contacts HR2 triggers off a brew cycle, and closure of contacts HR3 re-starts timer motor 167. Upon closure of contacts HR2, brew programmer motor 141 is energized via line 213, in which contacts 149 are closed since relay BR is deenergized at this time and in which contacts 214 are closed since relay AR is deenergized at this time, and the vendor then operates through a brew cycle the same as previously described for brewing of a three-cup batch, delivery of the batch to the receiver 1, and immediate transfer of the batch from receiver 1 to reservoir 3, valve 9 being open since relay TR is deenergized at this time and its contacts 152 are closed to complete circuit 211 for valve 9. Transfer relay TR remains deenergized until brewed coffee fills reservoir 3 up to electrode E1. While this brew cycle is proceeding, operation of switch VS is ineffective, since transfer relay TR is deenergized, meaning that switch 153 is down. As a result, operation of switch VS simply results in operation of motor 131 until cam C1 throws switch S1 off its upper contact on to its lower contact. However, when the transfer relay TR is finally energized, meaning that there is coffee in reservoir 3 to vend, switch 153 raises and motor 131 completes a vend cycle to vend a cup of coffee.

It is possible that, at times, reservoir 3 may not contain a full one-cup, two-cup or three-cup measure of coffee. This may be caused by evaporation or leakage of coffee from reservoir 3 if there has been no purchase for some time. Under these circumstances, unless special provision is made therefor, the purchaser of the third cup would receive less than a full cup. However, cam C2a and switch S2a take care of this by providing for completion of a vend cycle of vend motor 131 and transfer of a batch of coffee from receiver 1 to reservoir 3 by transfer valve 9 during the vend cycle. Assuming that coffee in reservoir 3 has been drawn down to the last cup, which under the circumstances as mentioned would be less than a full cup, and which means that the level is below electrode E3, cam C2a rotates along with cams C1 and C2 when vend motor 131 is set in operation by a purchaser's deposit of coin and actuation of vend switch VS. Cam C2a functions to close switch S2a slightly after closure of switch S2, holds it closed until switch S1 opens, and then opens switch S2a (see FIG. 3). Upon closure of switch S2a, motor 131 is held in operation to complete its single-revolution cycle via lines 187, 189, the lower pole of contacts 153 of relay TR (which is deenergized at this time) and line 158 including closed switch S2a, the latter being opened at the end of the single-revolution cycle. This insures completion of a vend cycle and full operation of transfer valve 9 by switch S2 to complete the transfer of coffee from receiver 1 to reservoir 3. This supplies additional coffee to reservoir 3 during the vending of the third cup to insure that the purchaser receives a full cup.

Figure 9:
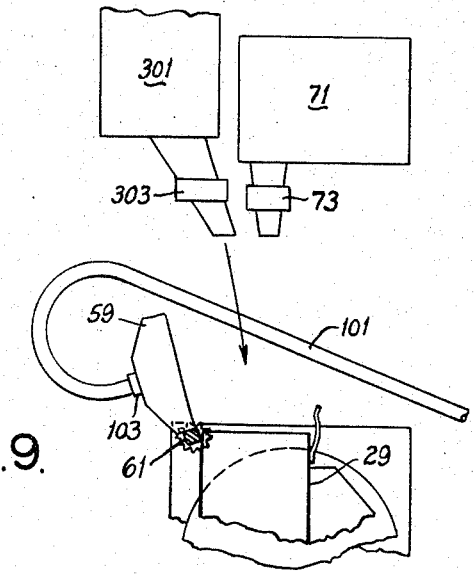
FIG. 9 is a view illustrating a modification.

FIG. 9 shows a possible modification in which, instead of providing the cleaning solution by passing hot water through the cartridge 123, line 121, cartridge 123 and valves 109 and 113 are omitted, and cleaning agent is dispensed into the brew pot at the start of a cleaning cycle from a hopper 301 containing a supply of cleaning agent having a dispenser 303 (a solenoid-operated dispenser, for example) for dispensing a measured amount of cleaning agent into the pot.

While the invention is herein described particularly as it relates to the so-called small-batch-brew vendor, it will be understood that various features of the invention are adaptable to other types of vendors, such as a single-cup-brew vendor. For example, a brew unit like unit 5 and the associated means for forcing water up into the brew pot of the brew unit and then down out of the pot may be adapted to a single-cup-brew vendor, as well as the cleaning system.

Also, various features of the invention are adaptable to a vendor utilizing an instant coffee substance instead of coffee ground from coffee beans. For example, the same system may be used tob rew batches of instant coffee, dispensing instant coffee instead of ground-bean coffee from hopper 71. In such case, the filter 69 would not be needed, and there would be no necessity for inverting the brew pot since there would be no spent grounds to dispose of. Similarly, various features of the invention are adaptable to single-cup instant coffee brewing, e.g., dispensing instant coffee into a pot like pot 29 and forcing one cup of water up into the pot and then down out of the pot. As to all such instant coffee brew adaptations, the cleaning system is applicable. As used herein the term "ground coffee" is intended to cover any particulate form of coffee, including ground-bean coffee and instant coffee powder, and the term "coffee substance" is intended to cover ground-bean coffee, instant coffee powder, and any other form of substance from which coffee may be brewed.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense.

What is claimed is:

1. In a vendor for brewing and vending coffee, a brew pot, means for holding a supply of coffee substance, means for dispensing a measured amount of coffee substance from said supply into said pot, means for delivering a measured amount of hot water into the pot in one direction for brewing a quantity of coffee in the pot, means for forcing the brewed coffee out of the pot in the opposite direction, and means for automatically recurrently cleaning out the brew pot with a cleaning solution followed by a water rinse, said cleaning means being operable in response to lapse of a predetermined interval of time after a vend cycle without a succeeding vend cycle.

2. In a vendor for brewing and vending coffee, a brew pot having a filter and a port on one side of the filter, means for holding a supply of ground coffee, means for dispensing a measured amount of coffee from said supply into the pot on the other side of the filter, means for delivering a measured amount of hot water into the pot through the port and the filter for brewing a quantity of coffee in the pot, means for forcing the brewed coffee out of the pot through the filter and the port, means for holding a supply of a cleaning agent, means for automatically recurrently cleaning out the brew pot with a cleaning solution of cleaning agent from said supply dissolved in water, followed by a water rinse, and coin-controlled means operable by a purchaser for effecting operation of the vendor through a vend cycle to vend a cup of brewed coffee, and wherein said cleaning means is operable in response to lapse of a predetermined interval of time after a vend cycle without a succeeding vend cycle.

3. In a vendor for brewing and vending coffee, a brew pot having a port at the bottom and a filter above the port, a lid for the pot, means for opening and closing the lid, a valve having an inlet, a transfer port and an outlet, the transfer port being connected to the brew pot port, said valve being adapted in a first position for flow from its inlet through the transfer port with the outlet blocked, and in a second position for flow from the transfer port through the outlet with the inlet blocked, means for holding a supply of ground coffee, means operable with the lid open to dispense a measured amount of ground coffee from said supply into the pot, means operable with the lid closed and the valve in its first position for delivering a measured quantity of hot water through the valve into the pot through the brew pot port and filter for brewing a quantity of coffee in the pot, and means operable with the lid closed and the valve in its second position for forcing the brewed coffee out of the pot through the filter, the brew pot port, and through the outlet of the valve, the means for delivering the hot water to the pot comprising a hot water metering vessel, and an air compressor connected to said vessel for delivering compressed air thereto for forcing water therefrom into the pot, the means for forcing the brewed coffee out of the pot comprising an air connection from said air compressor to the top of the pot and valve means for effecting delivery of air from the compressor alternately to the metering vessel and through said air connection to the pot.

4. In a vendor for brewing and vending coffee, a brew pot having a port at the bottom and a filter above the port, means mounting the brew pot for swinging movement about a horizontal axis offset from the vertical axis of the pot for movement between an upright brew position and an inverted dumping position, a lid mounted separately from the pot for closing the pot when in its brew position, means for opening and closing the lid, a valve having an inlet, a transfer port and an outlet, the transfer port having a flexible connection to the brew pot port, said valve being adapted in a first position for flow from its inlet through the transfer port with the outlet blocked, and in a second position for flow from the transfer port through the outlet with the inlet blocked, means for holding a supply of ground coffee, means operable with the pot in brew position and the lid open to dispense a measured amount of ground coffee from said supply into the pot, means operable with the pot in brew position, the lid closed, and the valve in its first position for delivering a measured quantity of hot water through the valve into the pot through the brew pot port and filter for brewing a quantity of coffee in the pot, means operable with the lid closed and the valve in its second position for forcing the brewed coffee out of the pot through the filter, the brew pot port and the outlet of the valve, and means operable thereafter to open the lid and swing the pot to inverted position for dumping the spent coffee grounds, wherein the means for delivering the hot water to the pot comprises a hot water tank, a metering vessel in the tank, means for opening the metering vessel for filling it with hot water from the tank and closing it, and an air compressor connected to said vessel for delivering compressed air thereto when said vessel is closed for forcing water therefrom through the valve to the pot, and wherein the means for forcing the brewed coffee out of the pot comprises a flexible air line connected to a port in the lid and valve means for effecting delivery of air from the compressor alternately to the metering vessel and said air line.

5. In a vendor for brewing and vending coffee, a brew pot having a port at the bottom and a filter above the port, means mounting the brew pot for swinging movement about a horizontal axis offset from the vertical axis of the pot for movement between an upright brew position and an inverted dumping position, a lid mounted separately from the pot for closing the pot when in its brew position, means for opening and closing the lid, a valve having an inlet, a transfer port and an outlet, the transfer port having a flexible connection to the brew pot port, said valve being adapted in a first position for flow from its inlet through the transfer port with the outlet blocked, and in a second position for flow from the transfer port through the outlet with the inlet blocked, means for holding a supply of ground coffee, means operable with the pot in brew position and the lid open to dispense a measured amount of ground coffee from said supply into the pot, means operable with the pot in brew position, the lid closed, and the valve in its first position for delivering a measured quantity of hot water through the valve into the pot through the brew pot port and filter for brewing a quantity of coffee in the pot, means operable with the lid closed and the valve in its second position for forcing the brewed coffee out of the pot through the filter, the brew pot port and the outlet of the valve, and means operable thereafter to open the lid and swing the pot to inverted position for dumping the spent coffee grounds further comprising means for holding a supply of a cleaning agent, and means for automatically recurrently cleaning out the brew pot comprising means operable to actuate said hot water delivery means for delivering hot water through the valve into the pot, together with a quantity of cleaning agent from the supply thereof, to effect cleaning of the pot by the resultant cleaning solution, means operable to actuate said forcing means to force the cleaning solution out of the pot, means operable to actuate the hot water delivery means for delivering hot water through the valve into the pot for rinsing the pot, and means operable to actuate the forcing means to force the rinse water out of the pot.

6. A vendor for brewing and vending coffee comprising a reservoir for holding a batch of brewed coffee, means for dispensing coffee in single-cup quantities from the reservoir, a receiver for holding a batch of brewed coffee for ultimate delivery to the reservoir, a valve between said receiver and said reservoir, a brew system comprising a brew pot, means for holding a supply of coffee substance, means for dispensing a measured amount of coffee substance from said supply into the pot, means for delivering hot water to the brew pot, allowing it to remain therein for a brewing interval to brew a batch of coffee and then delivering the batch to the receiver, means responsive to dispensing of a predetermined amount of coffee from the reservoir for initiating operation of the brew system to brew a batch of coffee and deliver it to the receiver, and means responsive to dispensing of a further amount of coffee from the reservoir for opening said valve for transferring the batch of brewed coffee in the receiver to the reservoir.

7. A vendor as set forth in claim 6 wherein said brew system brews a batch not more than six cups.

8. A vendor as set forth in claim 7 wherein said brew system brews a batch of three cups.

9. A vendor as set forth in claim 6 wherein said means for initiating operation of the brew system is responsive to dispensing of the next to last cup from the reservoir, and the means for transferring the batch from the receiver to the reservoir is responsive to the dispensing of the last cup from the reservoir.

10. A vendor as set forth in claim 6 further comprising means for effecting dumping of brewed coffee from the receiver and the reservoir, and means for automatically recurrently cleaning out the brew pot, receiver and reservoir comprising means for actuating said brewed coffee dumping means, then flushing out the pot, the receiver and the reservoir with a cleaning solution, followed by a water rinse of the pot, the receiver and the reservoir.

11. A vendor for brewing and vending coffee comprising a reservoir for holding a batch of brewed coffee, means for dispensing coffee in single-cup quantities from the reservoir, a receiver for holding a batch of brewed coffee for ultimate delivery to the reservoir, a valve between said receiver and said reservoir, a brew system comprising a brew pot having a filter and a port on one side of the filter, means for holding a supply of ground coffee, means for dispensing a measured amount of ground coffee from said supply into the pot, means for delivering a measured quantity of hot water into the pot through said port and the filter, allowing it to remain in the pot for a brewing interval to brew a batch of coffee, and then forcing the resultant batch out of the pot through the filter to the receiver, means responsive to dispensing of a predetermined amount of coffee from the reservoir for initiating operation of the brew system to brew a batch of coffee in the pot and deliver it to the receiver, and means responsive to dispensing of a further amount of coffee from the reservoir for opening said valve for transferring the batch of brewed coffee in the receiver to the reservoir.

12. A vendor for brewing and vending coffee comprising a reservoir for holding a batch of brewed coffee, means for dispensing coffee in single-cup quantities from the reservoir, a receiver for holding a batch of brewed coffee for ultimate delivery to the reservoir, a first valve between said receiver and said reservoir, a brew system comprising a brew pot having a filter and a port on one side of the filter, a second valve having an inlet and transfer port, the transfer port being connected to the brew pot port, said second valve being adapted in a first position for flow from its inlet through the transfer port with the outlet blocked, and in a second position for flow from the transfer port through the outlet with the inlet blocked, means for holding a supply of ground coffee, means for dispensing a measured amount of coffee from said supply into the pot on the other side of the filter, means operable with said second valve in its first position for delivering a measured quantity of hot water through said second valve into the pot through the brew pot port and filter, allowing it to remain in the pot for a brewing interval to brew a batch of coffee, means operable with said second valve in its second position for forcing the resultant batch of brewed coffee out of the pot through the filter, the brew pot port, and through the outlet of the valve to the receiver, means responsive to dispensing of a predetermined amount of coffee from the reservoir for initiating operation of the brew system to brew a batch of coffee in the pot and deliver it to the receiver, and means responsive to dispensing of a further amount of coffee from the reservoir for opening said first valve for transferring the batch of brewed coffee in the receiver to the reservoir.

13. A vendor for brewing and vending coffee comprising a reservoir for holding a batch of brewed coffee, means for dispensing coffee in single-cup quantities from the reservoir, a receiver for holding a batch of brewed coffee for ultimate delivery to the reservoir, a valve between said receiver and said reservoir, a brew system comprising a brew pot, a lid for the pot, means for opening and closing the lid, means for holding a supply of coffee substance, means operable with the lid open to dispense a measured amount of coffee substance from said supply into the pot, means operable with the lid closed for delivering a measured amount of hot water into the pot through its bottom and up through the filter, allowing the hot water to remain in the pot for a brewing interval to brew a batch of coffee, means operable with the lid closed for forcing the resultant batch of brewed coffee out of the pot through the filter to the receiver, means responsive to dispensing of a predetermined amount of coffee from the reservoir for initiating operation of the brew system to brew a batch of coffee in the pot and deliver it to the receiver, and means responsive to dispensing of a further amount of coffee from the reservoir for opening said valve for transferring the batch of brewed coffee in the receiver to the reservoir.

14. A vendor as set forth in claim 13 wherein the means for delivering the hot water to the pot comprises a hot water metering vessel, and means for delivering compressed air to said vessel for forcing water therefrom into the pot.

15. A vendor as set forth in claim 14 wherein the means for forcing the brewed coffee out of the pot comprises means for delivering compressed air into the top of the pot.

16. A vendor for brewing and vending coffee comprising a reservoir for holding a batch of brewed coffee, means for dispensing coffee in single-cup quantities from the reservoir, a receiver for holding a batch of brewed coffee for ultimate delivery to the reservoir, a first valve between said receiver and said reservoir, a brew system comprising a brew pot having a port at the bottom and a filter above the port, a lid for the pot, means for opening and closing the lid, a second valve having an inlet, a transfer port and an outlet, the transfer port being connected to the brew pot port, said second valve being adapted in a first position for flow from its inlet through the transfer port with the outlet blocked, and in a second position for flow from the transfer port through the outlet with the inlet blocked, means for holding a supply of ground coffee, means operable with the lid open to dispense a measured amount of ground coffee from said supply into the pot, means operable with the lid closed and said second valve in its first position for delivering a measured quantity of hot water through said second valve into the pot through the brew pot port and filter, allowing it to remain in the pot for a brewing interval to brew a batch of coffee, means operable with the lid closed and said second valve in its second position for forcing the resultant batch of coffee out of the pot through the filter, the brew pot port and through the outlet of said second valve to the receiver, means responsive to dispensing of a predetermined amount of coffee from the reservoir for initiating operation of the brew system to brew a batch of coffee in the pot and deliver it to the receiver, and means responsive to dispensing of a further amount of coffee from the reservoir for opening said first valve for transferring the batch of brewed coffee in the receiver to the reservoir.

17. A vendor as set forth in claim 16 wherein the means for delivering the hot water to the pot comprises a hot water metering vessel, and an air compressor connected to said vessel for delivering compressed air thereto for forcing water therefrom into the pot.

18. A vendor as set forth in claim 17 wherein the means for forcing the brewed coffee out of the pot comprises an air connection from said air compressor to the top of the pot and valve means for effecting delivery of air from the compressor alternately to the metering vessel and through said air connection to the pot.

19. A vendor for brewing and vending coffee comprising a reservoir for holding a batch of brewed coffee, means for dispensing coffee in single-cup quantities from the reservoir, a receiver for holding a batch of brewed coffee for ultimate delivery to the reservoir, a valve between said receiver and said reservoir, a brew system comprising a brew pot having a port at the bottom and a filter above the port, means mounting the brew pot for movement between an upright brew position and an inverted dumping position, a lid for closing the pot when in its brew position, means for opening and closing the lid, means for holding a supply of ground coffee, means operable with the pot in brew position and the lid open to dispense a measured amount of ground coffee from said supply into the pot, means operable with the pot in brew position and the lid closed for delivering a measured amount of hot water into the pot through its bottom and up through the filter, allowing it to remain in the pot for a brewing interval to brew a batch of coffee, means operable with the pot in brew position and the lid closed for forcing the resultant batch of brewed coffee out of the pot through the filter to the receiver, means for thereafter inverting the pot to dump the spent coffee grounds, means responsive to dispensing of a predetermined amount of coffee from the reservoir for initiating operation of the brew system to brew a batch of coffee in the pot and deliver it to the receiver, and means responsive to dispensing of a further amount of coffee from the reservoir for opening said valve for transferring the batch of brewed coffee in the receiver to the reservoir.

20. A vendor as set forth in claim 19 wherein the means for delivering the hot water to the pot comprises a hot water metering vessel, and means for delivering compressed air to said vessel for forcing water therefrom into the pot.

21. A vendor as set forth in claim 20 wherein the means for forcing the brewed coffee out of the pot comprises means for delivering compressed air into the top of the pot.

22. A vendor for brewing and vending coffee comprising a reservoir for holding a batch of brewed coffee, means for dispensing coffee in single-cup quantities from the reservoir, a receiver for holding a batch of brewed coffee for ultimate delivery to the reservoir, a first valve between said receiver and said reservoir, a brew system comprising a brew pot having a port at the bottom and a filter above the port, means mounting the brew pot for swinging movement about a horiontal axis offset from the vertical axis of the pot for movement between an upright brew position and an inverted dumping position, a lid mounted separately from the pot for closing the pot when in its brew position, means for opening and closing the lid, a second valve having an inlet, a transfer port and an outlet, the transfer port having a flexible connection to the brew pot port, said second valve being adapted in a first position for flow from its inlet through the transfer port with the outlet blocked, and in a second position for flow from the transfer port through the outlet with the inlet blocked, means for holding a supply of ground coffee, means operable with the pot in brew position and the lid open to dispense a measured amount of ground coffee from said supply into the pot, means operable with the pot in brew position, the lid closed, and said second valve in its first position for delivering a measured quantity of hot water through said second valve into the pot through the brew pot port and filter, allowing it to remain in the pot for a brewing interval to brew a batch of coffee, means operable with the lid closed and said second valve in its second position for forcing the resultant batch of brewed coffee out of the pot through the filter, the brew pot port and the outlet of said second valve to the receiver, means operable thereafter to open the lid and swing the pot to inverted position for dumping the spent coffee grounds, means responsive to dispensing of a predetermined amount of coffee from the reservoir for initiating operation of the brew system to brew a batch of coffee in the pot and deliver it to the receiver, and means responsive to dispensing of a further amount of coffee from the reservoir for opening said first valve for transferring the batch of brewed coffee in the receiver to the reservoir.

23. A vendor as set forth in claim 22 wherein the means for delivering the hot water to the pot comprises a hot water tank, a metering vessel in the tank, means for opening the metering vessel for filling it with hot water from the tank and closing it, and an air compressor connected to said vessel for delivering compressed air thereto when said vessel is closed for forcing water therefrom though the valve to the pot.

24. A vendor as set forth in claim 23 wherein the means for forcing the brewed coffee out of the pot comprises a flexible air line connected to a port in the lid and valve means for effecting delivery of air from the compressor alternately to the metering vessel and said air line.

25. A vendor for brewing and vending coffee comprising a reservoir for holding a batch of brewed coffee, means for dispensing coffee in single-cup quantities from the reservoir, a receiver for holding a batch of brewed coffee for ultimate delivery to the reservoir, a hot water tank, a hot water metering vessel submerged in the tank, a valve for opening the metering vessel for filling it with hot water from the tank and closing it, a brew pot having a port at the bottom and a filter above the port, means mounting the brew pot for swinging movement above a horizontal axis offset from the vertical axis of the pot for movement between an upright position and an inverted dumping position, a lid mounted separately from the pot for closing the pot when in its brew position, said lid having a port, means for operating the lid and pot in a sequence involving closure of the lid on the pot in brew position, dwell of the lid in closed position, opening of the lid, inversion of the pot for dumping, and return of the pot to brew position, means for effecting communication from the metering vessel to the brew pot through the brew pot port and alternately effecting communication from the pot through the brew pot port to the receiver, an air compressor, means for effecting communication from the air compressor to the metering vessel and alternately effecting communication from the compressor to the port in the lid, means for holding a supply of ground coffee, means operable with the pot in brew position and the lid open to dispense a measured amount of ground coffee from the supply into the pot, a brew programmer for effecting operation of the vendor through a brew cycle involving operation of the ground coffee dispensing means to dispense a measured amount of ground coffee into the pot, closure of the lid, operation of the air compressor for delivery of compressed air to the metering vessel to force hot water from the metering vessel into the pot, brewing of a batch of coffee in the pot, delivery of compressed air through the port in the lid to force the resultant batch through the filter and out of the pot to the receiver, opening of the lid, inversion of the pot for dumping the spent grounds, and return of the pot to brew position, means responsive to dispensing of a predetermined amount of coffee from the reservoir for initiating operation of the brew programmer, and means responsive to dispensing of a further amount of coffee from the reservoir for transferring the batch in the receiver to the reservoir.

26. A vendor as set forth in claim 25 wherein said brew system brews a batch not more than six cups.

27. A vendor as set forth in claim 26 wherein said brew system brews a batch of three cups.

28. A vendor as set forth in claim 25 wherein said means for initiating operation of the brew system is responsive to dispensing of the next to last cup from the reservoir, and the means for transferring the batch from the receiver to the reservoir is responsive to the dispensing of the last cup from the reservoir.

29. A vendor as set forth in claim 25 further comprising means for effecting dumping of brewed coffee from the receiver and the reservoir, means for holding a supply of a cleaning agent, and a cleaning cycle programmer for effecting operation of the vendor through a cleaning cycle involving operation of the brewed coffee dumping means to dump brewed coffee from the receiver and the reservoir, operation of the air compressor for delivery of compressed air to the metering vessel to force hot water from the metering vessel into the pot, addition of cleaning agent from the supply thereof to the hot water to provide a cleaning solution for cleaning the pot, delivery of compressed air through the port in the lid to force the cleaning solution through the filter and out of the pot and successively through the receiver and the reservoir, operation of the air compressor for delivery of compressed air to the metering vessel to force hot water from the metering vessel into the pot for rinsing the pot, and delivery of compressed air through the port in the lid to force the rinse water through the filter and out of the pot and successively through the receiver and the reservoir.

30. A vendor for brewing and vending coffee comprising a brewer for brewing coffee to be vended, coin-controlled means operable by a purchaser for effecting operation of the vendor through a vend cycle to vend a cup of brewed coffee, and means responsive to lapse of a predetermined length of time after a vend cycle without a succeeding vend cycle for automatically cleaning out the brewer comprising means for applying a cleaning solution to the brewer, and means for thereafter rinsing out the brewer with water.

31. A vendor as set forth in claim 30 wherein the means for applying the cleaning solution to the brewer is effective to hold the solution in the brewer for a cleaning interval and then effective to drain the solution from the brewer.

32. A vendor as set forth in claim 31 wherein the rinsing means is effective to hold the rinse water in the brewer in the brewer for a rinse interval and then effective to drain the rinse water from the brewer.

33. A vendor for brewing and vending coffee comprising a brewer for brewing coffee to be vended, a source of hot water for supplying the brewer with hot water for brewing coffee, first means for removing spent coffee grounds from the brewer after each brew cycle, and second means for cleaning out the brewer at intervals other than after each brew cycle comprising a source of a cleaning agent, means for washing out the brewer with a solution of cleaning agent in hot water derived from said respective sources, and means for thereafter rinsing out the brewer with hot water from said hot water source.

34. A vendor as set forth in claim 33 wherein the means for washing out the brewer comprises means for delivering hot water and cleaning agent to the brewer and holding the resultant cleaning solution in the brewer for a claning interval and then draining the cleaning solution from the brewer.

35. A vendor as set forth in claim 34 wherein the rinsing means is effective to hold the rinse water in the brewer for a rinse interval and then effective to drain the rinse water from the brewer.

36. A vendor as set forth in claim 35 wherein the hot water is delivered to the brewer through the source of cleaning agent.

37. A vendor as set forth in claim 33 wherein the hot water and cleaning agent are separately delivered to the brewer.

38. A vendor for brewing and vending coffee comprising a brewer for brewing coffee to be vended, a source of hot water for supplying the brewer with hot water for brewing coffee, coin-controlled means operable by a purchaser for effecting operation of the vendor through a vend cycle to vend a cup of brewed coffee, and means responsive to lapse of a predetermined length of time after a vend cycle without a succeeding vent cycle for automatically cleaning out the brewer comprising a source of a cleaning agent, means for washing out the brewer with a solution of cleaning agent in hot water derived from the respective sources, and means for thereafter rinsing out the brewer with hot water from the source thereof.

39. A vendor as set forth in claim 38 wherein the means for washing out the brewer comprises means for delivering hot water and cleaning agent to the brewer and holding the resultant cleaning solution in the brewer for a cleaning interval and then draining the cleaning solution from the brewer.

40. A vendor as set forth in claim 39 wherein the rinsing means is effective to hold the rinse water in the brewer for a rinse interval and then effective to drain the rinse water from the brewer.

41. A vendor as set forth in claim 38 wherein the hot water is delivered to the brewer through the source of cleaning agent.

42. A vendor as set forth in claim 38 wherein the hot water and cleaning agent are separately delivered to the brewer.

43. A vendor for brewing and vending coffee comprising a brewer for brewing coffee to be vended, coin-controlled means operable by a purchaser for effecting operation of the vendor through a vend cycle to vend a cup of brewed coffee, means for holding a supply of ground coffee, means for dispensing a measured amount of coffee from said supply into the brewer, means for holding a supply of hot water, means for delivering a measured amount of hot water into the brewer for brewing a quantity of coffee in the brewer, means for discharging the spent coffee grounds from the brewer, and means for automatically recurrently cleaning out the brewer at intervals other than that for discharging the spent coffee grounds comprising means for holding a supply of a cleaning agent, means for washing out the brewer with a solution of cleaning agent and hot water derived from said respective supplies, and means for thereafter rinsing out the brewer with hot water from said supply.

44. A vendor as set forth in claim 43 wherein the cleaning means is operable in response to lapse of a predetermined length of time after a vend cycle without a succeeding vend cycle.

45. In a vendor for brewing and vending coffee, means for brewing a batch of coffee, means for holding a batch of brewed coffee for being vended, coin-controlled means operable by a purchaser for effecting operation of the vendor through a vend cycle to vend a cup of brewed coffee from said batch, means for dumping brewed coffee from said holding means, means for cleaning the brewing and holding means, and means responsive to lapse of a predetermined interval of time after a vend cycle without a succeeding vend cycle for actuating said dumping means and said cleaning means.

46. A vendor as set forth in claim 45 wherein said time-interval responsive means comprises an electric timer, a circuit for energizing said timer and tending to cause it to operate continuously, and means for resetting said timer to zero in response to operation of the vendor through a vend cycle.

47. A vendor as set forth in claim 46 further comprising means operable in response to initiation of operation of said cleaning means for holding said timer out of operation until the next operation of the vendor through a vend cycle.

48. In a vendor for brewing and vending coffee, a brew pot, a first shaft mounting the brew pot for swinging movement between an upright brew position and an inverted dumping position, a lid, a second shaft mounting the lid for swinging movement about a fixed axis relative to the pot for closing the pot when in its upright brew position, a rotary member, and interengageable drive elements on said member and said shafts for effecting closing of the lid upon rotation of said member through part of a revolution, and for effecting opening of the lid, inversion of the pot, and return of the pot to brew position upon rotation of said member through the remainder of a revolution, and wherein said pot has a port at the bottom and a filter above the port, said lid has a port, said first shaft is offset from the vertical axis of the pot, and said interchangeable elements comprise gears on the shafts and inside and outside gear elements secured to said rotary member.

References Cited
UNITED STATES PATENTS

| | | | |
|---|---|---|---|
| 2,016,281 | 10/1935 | Harper et al. | 99—289 X |
| 2,770,248 | 11/1956 | Audia | 137—240 |
| 2,887,038 | 5/1959 | Rosander | 99—283 X |
| 2,906,193 | 9/1959 | McCauley | 99—283 |
| 2,910,928 | 11/1959 | Rota | 99—289 |
| 3,011,426 | 12/1961 | Mueller | 99—289 X |
| 3,103,159 | 9/1963 | Breitenstein | 99—289 |
| 3,194,147 | 7/1965 | Cowley | 99—289 X |
| 3,221,637 | 12/1965 | Small et al. | 99—289 |
| 3,223,023 | 12/1965 | Miller | 99—289 |

WILLIAM I. PRICE, *Primary Examiner.*

WALTER A. SCHEEL, *Examiner.*

S. P. FISHER, *Assistant Examiner.*